US005660735A

United States Patent [19]
Coltrinari et al.

[11] Patent Number: 5,660,735
[45] Date of Patent: *Aug. 26, 1997

[54] METHOD FOR REMOVING METALS FROM WASTE SOLUTIONS

[75] Inventors: Enzo Coltrinari, Golden; Wayne C. Hazen, Denver, both of Colo.

[73] Assignee: Hazen Research, Inc., Golden, Colo.

[*] Notice: The term of this patent shall not extend beyond the expiration date of Pat. No. 5,536,416.

[21] Appl. No.: 683,530

[22] Filed: Jul. 15, 1996

Related U.S. Application Data

[63] Continuation of Ser. No. 332,536, Oct. 31, 1994, Pat. No. 5,536,416.

[51] Int. Cl.$^6$ .................................................. C02F 1/62
[52] U.S. Cl. .................... 210/723; 210/729; 210/730; 210/731; 210/747; 210/769; 210/911; 210/912; 210/913; 210/914; 210/734
[58] Field of Search .................................. 210/723, 769, 210/724, 729, 730, 731, 747, 911, 912, 913, 914, 734

[56] References Cited

U.S. PATENT DOCUMENTS

| | | | |
|---|---|---|---|
| 3,235,489 | 2/1966 | Bell et al. | 210/51 |
| 3,537,986 | 11/1970 | Watansbe et al. | 210/15 |
| 4,324,667 | 4/1982 | Konstantinov et al. | 210/729 |
| 4,559,143 | 12/1985 | Asada et al. | 210/714 |
| 4,710,298 | 12/1987 | Noda et al. | 210/505 |
| 4,758,414 | 7/1988 | Gifford et al. | 423/122 |
| 4,764,281 | 8/1988 | Elfline | 210/668 |
| 4,800,024 | 1/1989 | Elfline | 210/665 |
| 4,909,944 | 3/1990 | Jackson | 210/674 |
| 4,980,071 | 12/1990 | Shuster et al. | 210/725 |
| 4,999,116 | 3/1991 | Bowers | 210/709 |
| 5,006,262 | 4/1991 | Weyls et al. | 210/719 |
| 5,078,900 | 1/1992 | Wegner | 210/728 |
| 5,164,095 | 11/1992 | Sparapany et al. | 210/735 |
| 5,262,064 | 11/1993 | El-Shall | 210/728 |
| 5,283,123 | 2/1994 | Carter et al. | 210/504 |

FOREIGN PATENT DOCUMENTS

| | | | |
|---|---|---|---|
| 32891 | 3/1978 | Japan | 210/504 |
| 50439 | 4/1980 | Japan | 210/504 |

*Primary Examiner*—Neil McCarthy
*Attorney, Agent, or Firm*—Sheridan Ross P.C.

[57] ABSTRACT

The present invention is a method to remove metals from solutions by precipitating the metals and adding cellulosic fiber to the solution. The precipitates attach to the cellulosic fibers to form products. The products may be removed from the solution by gravity separation techniques or by filtration. The removed products may be dewatered and incinerated. The method provides a simple and effective technique for removing low concentrations of metals from high volume solution streams.

37 Claims, 1 Drawing Sheet

METHOD FOR REMOVING METALS FROM WASTE SOLUTIONS

This is a continuation of application Ser. No. 08/332,536, filed Oct. 31, 1994, now U.S. Pat. No. 5,536,416.

FIELD OF THE INVENTION

The present invention is a method for removing metals from a solution. More particularly, the present invention embodies an improved approach for removing precipitates containing such metals from an effluent.

BACKGROUND OF THE INVENTION

Discharges of metals into the environment are a major problem worldwide. Metal discharges severely damage the environment, being responsible each year for the contamination of water resources and destruction of plant and animal life.

Metal discharges into surface and ground water resources (e.g., streams, rivers, ponds, lakes, and aquifers) pose the greatest risk to wildlife and human health. Such discharges may be either manmade, such as discharges by industrial facilities, or natural, such as water runoff/from caves and mines. Treatment of contaminated surface and ground water resources is complicated not only by the large quantities of water but also by the dilute concentrations of metals contained in the resources.

Existing methods to remove metals from aqueous solutions are poorly suited to remove dilute concentrations of metals from large quantities of water to achieve the purity levels mandated by state and federal laws. Existing metal removal methods include the steps of precipitating the metals and removing the precipitates from the solution by filtering or by density separation techniques, such as by settling.

The conventional filtering techniques are not only uneconomical but also can fail to remove a significant portion of the precipitates in many applications. The dilute (e.g., parts per million) concentrations of metals in surface and ground water resources cause very small metal precipitates to form. As will be appreciated, such precipitates can form a thick filter cake or gelatinous mass on the filter causing a large pressure drop across the filter and a small filter flux. The resulting flux is typically too low to handle economically the large amounts of contaminated water. Many resources contain particulate matter, other than the precipitates, that further impedes the filtering step.

Another conventional technique to remove precipitates, is by density separation, which is also not economical in most cases. The most common density separation technique for large quantities of water is a settling pond, where metal precipitates settle out of solution. Settling ponds are typically undesirable as they require large land areas that are often not available, create a highly toxic sludge in the pond bottom that is often difficult to dispose of, and often fail to attain desired levels of purity in the pond overflow.

Other techniques to remove metal contaminants from surface and groundwater resources require expensive components and/or otherwise raise other operational complications.

Therefore, there is a need for a process to inexpensively remove metals from surface and ground water resources having low concentrations of metals.

SUMMARY OF THE INVENTION

In a preferred embodiment, the present invention relates to a novel method for remediation of feed solutions containing a metal. In a first step, a feed solution is provided containing a metal precipitate. In a second step, discrete fibers are dispersed in the feed solution. The precipitate attaches to a discrete fiber to form a product. The product is removed from the feed solution to form a treated solution and a recovered product.

The precipitate preferably includes hydroxides, silicates, sulfides, xanthates, phosphates, carbonates, cellulose-derivatives, and mixtures thereof. More preferably, the precipitate includes hydroxides, silicates, carbonates, and mixtures thereof. In one embodiment, the precipitate is formed by precipitating the metal from the feed solution using a precipitant. The precipitant preferably includes a hydroxide, silicate, sulfide, xanthate, phosphate, carbonate, hydroxyethyl cellulose, and mixtures thereof. In an alternate embodiment, the discrete fibers may include the precipitant.

In one embodiment, the product is removed from the feed solution by filtering. The filtering step may be preceded by a thickening step. In an alternate embodiment, the product is removed from the feed solution by a density separation method.

After product removal, the treated solution preferably has a metal concentration that is less than the maximum concentrations for discharges into water resources under regulations promulgated by the Environmental Protection Agency.

The recovered product may be dewatered. The recovered product preferably has a water content less than about 90% by weight before dewatering. The dewatered product preferably has a water content less than about 30% by weight. The dewatered product may be combusted.

In an alternate embodiment, a method is provided for concentrating the metals in the feed solution. In a first step, the metals are precipitated from the feed solution. In a second step, discrete fibers are dispersed in the feed solution to form the product. The product is allowed to collect in a portion of the feed solution by density separation techniques.

Various embodiments of the present invention offer numerous advantages over existing methods and apparatuses. First, one embodiment of the present invention provides an inexpensive and simple method to purify large quantities of contaminated water at high flow rates. The product of the fibers and precipitates may be selected such that the product is substantially larger than the precipitates alone. The product size allows the present invention to employ larger filter pore sizes and therefore higher filter fluxes than is possible with conventional purification methods. The product size may be selected such that other entrained particulate matter is smaller than the product and passes through the filter while the product does not.

Second, another embodiment of the present invention may economically purify solutions having low metal concentrations. Unlike conventional methods, which produce smaller metal precipitates for lower metal concentrations, the present invention employs fibers to collect the metal precipitates before removal. The product of the fiber and metal precipitates may then be rapidly and easily removed by any number of methods known in the art.

Third, in another embodiment of the present invention, high settling rates of product can be attained by appropriate selection of product size and the use of settling aids. This improvement permits the product to be removed more rapidly by flocculation, thickening, and filtration of the feed solution, than would otherwise be possible with the precipitate alone.

Fourth, recovered product of the present invention may have a much smaller volume than the sludge produced by conventional purification methods. Thus, subsequent handling and disposal of such materials is relatively more simple. For example, the recovered product may be incinerated to an even smaller volume than the recovered product. The cinders from incineration may be disposed of or further treated to recover the metals contained in the cinders. The disposal of cinders is much easier and less expensive than the cost to dispose of the sludge or filtrate produced by conventional purification methods.

DETAILED DESCRIPTION

Figure 1:
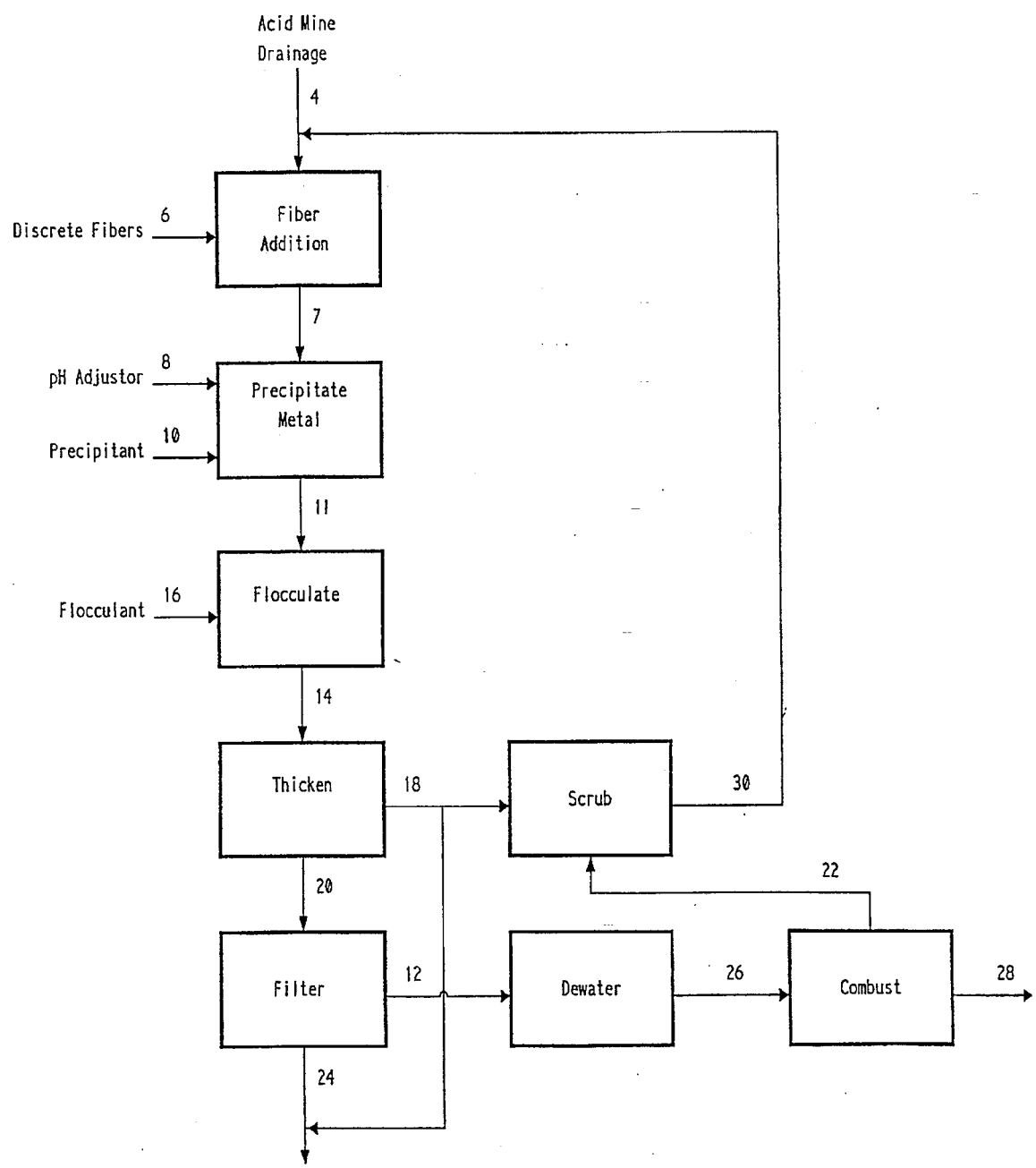
FIG. 1 is a flow schematic of the subject invention, illustrating the use of fibers to remove metal precipitates from solution.

A first embodiment of the present invention is a method for remediation of a feed solution containing a metal. The metal is contained in a precipitate. Discrete fibers are dispersed in the feed solution to form a product including a fiber and the precipitate. The product is removed from the feed solution to form a treated solution and a recovered product.

The feed solution may be any liquid containing a metal. Preferably, the feed solution is aqueous. More preferably, the feed solution is a portion of a stream, river, pond, lake, or any other naturally occurring or manmade aqueous stream or reservoir. The process of the present intention can be conducted in a channel, reservoir, or other type of container. Preferably, the feed solution is provided for remediation in a channel, such as a sluice box, or in a stirred tank.

A preferred embodiment of the present invention purifies a feed solution having a high rate of flow. The flow rate of the feed solution is preferably greater than about 10 gallons per minute, more preferably greater than about 100 gallons per minute, and most preferably greater than about 500 gallons per minute. Such flow rates are in excess of the amount of water that can be readily and effectively treated by conventional methods.

The metal to be removed from the feed solution preferably is a transition element (an element from Groups IB through VIIB and Group VIII of the Modern Periodic Table of the Elements), an alkali metal (Group 1A), an alkaline earth metal (Group 11A), aluminum, boron, lead, arsenic, selenium, fluorine, compounds thereof, or mixtures thereof. Most preferably, the metal is aluminum, arsenic, beryllium, boron, cadmium, chromium, fluorine, nickel, selenium, vanadium, lithium, molybdenum, barium, lead, mercury, silver, copper, zinc, iron, manganese, compounds thereof, or mixtures thereof.

The present invention is particularly suited to the removal of low metal concentrations from the feed solution. Surprisingly, the present invention may remove significant portions of metal from feed solutions having metal concentrations less than about 50 mg/l. The present invention removes preferably at least about 75, more preferably at least about 85, and most preferably at least 90% by weight of metals from a feed solution having a concentration less than about 50 mg/l.

The metal may be in the form of either an element or a metal-containing compound (hereinafter collectively referred to as "metal"). In one embodiment of the present invention, the metal is in the feed solution in the form of a precipitate. As used herein, "precipitate" refers to any compound containing the metal that is insoluble in the solution. For aqueous solutions, the metal-containing compound should be water insoluble. Preferably, the precipitate is a hydroxide, silicate, sulfide, xanthate, phosphate, carbonate, cellulose-derivatives, or mixtures thereof. More preferably, the precipitate is environmentally benign. Most preferably, the precipitate is a hydroxide, silicate, carbonate, or mixtures thereof.

In an alternate embodiment of the present invention, the metal is in a form that is soluble in the solution and is precipitated from the feed solution to form the precipitate. "Precipitated" or "precipitating" refers to any process that causes a dissolved metal to form a precipitate. Preferably, such a process includes a chemical reaction between the soluble metal and a precipitant that produces a precipitate.

A precipitant may be introduced to the feed solution before, concurrent with, or after the discrete fibers are dispersed in the feed solution. As used herein, "precipitant" refers to any element or compound capable of forming a precipitate with the metal in the feed solution. Preferably, the precipitant is selected such that the precipitant and the precipitate containing the metal are each environmentally benign. More preferably, the precipitant is a hydroxide, silicate, sulfide, xanthate, phosphate, carbonate, hydroxyethyl cellulose, or mixtures thereof. Most preferably, the precipitant is $CaCO_3$, $Na_2CO_3$, $Ca(OH)_2$, $Na_2SiO_3$, $CaS$, $NaHS$, $H_3PO_4$, $CaH_4(PO_4)_2$, or mixtures thereof.

The precipitant may be contacted with the feed solution either as a part of the discrete fibers or as a separate additive, as desired. In the case of the precipitant as part of the fiber, the precipitant may be attached to the discrete fibers by any means known in the art to form functionalized fibers. The functionalized fibers may form the metal-containing precipitate either directly on the discrete fibers or in the feed solution. For functionalized fibers, the precipitant is preferably a phosphate, xanthate, or hydroxyethyl cellulose.

The desired concentration of the precipitant in the feed solution is great enough to obtain acceptable reaction with metal in the feed solution. The precipitant is preferably present in the feed solution in at least stoichiometric amounts relative to that amount of metal in feed solution to be removed. More preferably, the precipitant is at least about 200% of the stoichiometric amount relative to the amount of metal in the feed solution to be removed.

The time provided for reaction between the precipitant and the metal in the feed solution between introduction of the precipitant and removing product from the feed solution is sufficient for substantial completion of the reaction. Preferably, the residence time for substantial completion of the reaction ranges between about 1 to about 120 minutes, more preferably between about 1 to about 30 minutes, and most preferably between about 1 to about 10 minutes.

As noted above, a discrete fiber is dispersed into the feed solution to form a product with the precipitate. "Discrete fibers" refer to fibers that are not attached to one another. The fibers are preferably composed of cellulose, glass, plastic, cotton, or wool. More preferably, the fiber is composed of cellulose. "Cellulose" refers to a natural carbohydrate polymer having anhydroglucose units joined by an oxygen linkage to form long molecular chains. For example, the discrete fibers may be in the form of shredded paper.

The fibers can be of varying sizes and shapes and typically are elongated in at least one dimension. For example, a paper fiber is a material having a size of less than about 3.0 mm, more preferably less than about 2.5 mm, and most preferably less than about 2.0 mm. Preferably, the median size of the discrete fibers is less than about 2.5 mm. The size and median size of the discrete fibers is measured based on the longest dimension of the discrete fibers. As will be appreciated, the size of the discrete fibers may be selected either to yield a desired settling rate of product in the feed solution or to permit the use of a desired filter pore size to remove the product from the feed solution. The desired size distribution of fibers can depend upon the application. Both broad and narrow size distributions are within the scope of the invention. Typically, the size distribution of the discrete fibers will be directly proportional to the size distribution of the product. Generally, the size of the product is not significantly different from the size of the fiber from which the product originated.

The settling rate of product may be further increased to a desired rate by the use of settling aids with the fibers. As used herein, a "settling aid" refers to a substance that attaches to the product and causes the specific gravity of the product and the settling aid to be greater than the specific gravity of the product alone. Preferred settling aids are sand and magnetite.

In one embodiment of the present invention, the discrete fibers may be dispersed in the feed solution as part of an aqueous slurry. In an alternative embodiment, dry discrete fibers may be added directly to the feed solution. The addition of the discrete fibers to the feed solution as a slurry allows for more rapid dispersion of the fibers relative to the addition of dry discrete fibers paper directly to the feed solution.

The volume of the discrete fibers dispersed in the feed solution can vary depending on process conditions and is selected so as to achieve acceptable remediation. Preferably, the concentration of the discrete fibers dispersed in the feed solution is from about 10 to about 1000, more preferably from about 50 to about 800, and most preferably from about 100 to about 500 mg/l.

The dispersion of the discrete fibers in the feed solution may be accelerated by agitation. The agitation may be induced passively by baffles or actively by mechanical means, such as an impeller in a stirred tank.

It has been found that by operation of the present invention, the discrete fibers attach to the precipitates to form products. The attachment between the precipitate and the fiber occurs whether the precipitant is attached to the discrete fibers or added to the feed solution separately from the fibers.

The time between the introduction of discrete fibers into the feed solution and the removal of the product from the feed solution is sufficient to achieve acceptable precipitation of metals from the solution. Preferably, the time is sufficient for a majority, more preferably at least 75%, and most preferably at least 95% of the precipitate to form a product with the discrete fibers.

The process of the invention can further include removing the product from the feed solution to form a treated solution and a recovered product. In one embodiment of the present invention, the removing step includes filtering the feed solution to remove the product. As used herein, "filtering" includes screening as well as filtering. In the filtering step, the feed solution is filtered to form the treated solution as the filtrate and the recovered product as the cake. The filtration of the feed solution may be accomplished by any continuous or non-continuous filters known in the art. A preferred filter is continuous. The more preferred filters are rotary drum and rotary disk filters and the most preferred filters are rotary drum filters, such as string filters and rotary belt filters.

The filter pore size is a function of the size distribution of the discrete fibers and the size distribution of other particulate matter in the feed solution. Thus, the filter pore size may be selected based upon the size distribution of the discrete fibers.

The filter pore size is preferably sufficient to retain substantially all of the discrete fibers while passing substantially all of the feed solution and other particulate matter entrained therein. To remove entrained particulate matter larger than the discrete fibers, it may be desirable to have located upstream screens or secondary filters that have a pore size sufficient to remove the entrained particulate matter but large enough to pass substantially all of the discrete fibers.

The filter pore size desirably retains at least about 80%, more desirably at least about 90%, and most desirably at least about 95% of the discrete fibers. To retain the desired amount of the fibers, the filter pore size is desirably smaller than the longest dimension of that portion of the size distribution of the fibers that is sought to be recovered. Preferably, the filter pore size ranges from no more than about 2.0, more preferably no more than about 1.0 and most preferably no more than about 0.5 mm.

As will be appreciated, density separation methods may be employed to remove the product from the feed solution. By way of example, the product may be allowed to settle under gravity in settling ponds. As stated above, the size distribution of the fibers may be selected to yield a desired settling rate of the product in the feed solution. The upper portion of the feed solution may be removed after settling of the product is completed. Other methods to remove the product include classifiers, centrifuges, and so forth.

In some embodiments, the feed solution is contacted with a flocculant to concentrate the product in the feed solution or to assist in formation of a product between a fiber and a precipitate. As used herein, "flocculant" refers to any substance that increases the cohesive forces among the discrete fibers or among fibers and precipitates in the feed solution. The flocculant assists in formation of product or removal of the product from the feed solution by aggregating the product into discrete domains in the feed solution. The aggregated product more quickly settles under gravity to the bottom of the feed solution than does the product in the absence of the flocculant.

The flocculant may be a polyacrylamide. For example, a suitable polyacrylamide flocculant is sold under the trademark "PERCOL 351".

The desired concentration of flocculant in the feed solution is a function of the concentration of the product (e.g., the concentration of the discrete fibers introduced into the feed solution) in the feed solution. Preferably, the flocculant concentration is less than about 1 mg/l and typically is from about 0.1 to about 1 mg/l.

In a further alternative embodiment, which may be used in combination with flocculation, the feed solution, after flocculation, may be treated by thickening techniques known in the art to produce an overflow solution and slurry. Thickening facilitates later filtration by reducing the volume of solution that needs to be filtered to remove the product. Thickening concentrates the product and the discrete fibers in a lower portion of the flocculated solution, thereby permitting an upper portion to be removed as the overflow solution. In this embodiment, the slurry is preferably no more than about 1/20, more preferably no more than about 1/50, and most preferably no more than about 1/100 of the volume of the feed solution. The overflow solution preferably contains less than about 30% of product, more preferably contains less than about 20% of product, and most preferably is substantially free of product.

The treated solution formed from the process as broadly described above preferably contains less than the concentrations allowed by applicable local, state or federal regulations. For example, the United States Environmental Protection Agency establishes allowable concentrations for various metals of the present invention for agricultural and domestic uses. Such standards are hereby incorporated by reference.

The recovered product may be conveniently disposed of by several techniques. In one embodiment, the recovered product is dewatered. Before dewatering, the recovered product has a water content of more than about 50%, more typically more than about 75%, and most typically more than about 90% by weight. The dewatered product has a water content less than about 30%, more preferably less than about 20%, and most preferably less than about 10% by weight. The recovered product may be dewatered by any means known in the art, including compaction or drying.

In another embodiment, the recovered product and particularly, dewatered product may be incinerated to produce cinders and a waste gas. The waste gas may be scrubbed with the overflow solution to remove deleterious materials, including metals. The overflow solution after scrubbing (e.g., the scrubbing solution) is recycled. Before recycle, it is possible to recover the metals from the scrubbing solution by standard techniques. The cinders may be disposed of or recycled, as desired.

In an alternative embodiment of the present invention, the metals may be concentrated in a solution by precipitating the metal from the solution to form a precipitate; dispersing discrete fibers in the solution to form a product containing a discrete fiber and the precipitate; and allowing the product to collect in a portion of the solution by density separation techniques.

This embodiment is particularly applicable to large, stationary bodies of water, such as lakes, reservoirs and ponds, to concentrate metals in the bottom sediments of the body of water in a form that is less harmful to aquatic life. It is often not practical to remove the settled product from the bottom sediments. The removal cost may be prohibitive due to the cost to remove the bottom sediments, typically by dredging, and to dispose of the removed material.

FIG. 1 depicts a preferred embodiment of the present invention as applied to water runoff from a mine (hereinafter called "acid mine drainage"). Discrete fibers 6 are introduced into feed solution 4 by any means known in the art to form a fiber-containing solution 7.

A precipitant 11 and, in some cases, pH adjustor 8 may be contacted with fiber-containing solution 7 to form a precipitate-containing solution 9. This step is desired if the metal is in a water soluble form and must be precipitated. The pH adjustor 8 may be an acid or base, as desired. In some applications, the pH adjustor 8 is unnecessary since pH adjustment is provided by the precipitant. The pH is adjusted to provide the desired conditions in precipitate-containing solution 9 for precipitant 10 to react with the metal to form a precipitate. Preferably, pH adjuster 8 is an environmentally benign compound. For acid mine drainage, to make the pH more basic the preferred pH adjustor 8 is a hydroxide, such as calcium hydroxide, or carbonate, such as calcium carbonate and/or sodium carbonate. To make the pH more acidic, the preferred pH adjustor 8 is sulfuric acid or carbonic acid. The preferred pH in precipitate-containing solution 9 ranges from about 4 to about 11 and more preferably from about 6 to about 8.5.

Precipitate-containing solution 9 may be contacted with flocculant 16 to concentrate the product in flocculated solution 14. In flocculated solution 14, the metal-containing precipitate attaches to discrete fibers 6 to form a product in the precipitate-containing solution 9. Flocculated solution 14 may be treated by any thickener known in the art to produce an overflow solution 18 and slurry 20.

Overflow solution 18 may be used to scrub waste gas 22 in a conventional scrubber. The portion of overflow solution 18 that is not used to scrub waste gas 22 may be added to treated solution 24.

Recovered product 12 may be dewatered. Dewatered product 26 may be incinerated to form waste gas 22 and cinders 28. Waste gas 22 may be scrubbed with overflow solution 18 to remove deleterious materials, including metals. The scrubbing solution 30 may be added to feed solution 4 for purification. Cinders 28 may be disposed of or recycled, as desired.

EXAMPLE 1

A series of tests were run to illustrate that by using paper fiber, a type of fiber, sludge settling, filtering and compaction is improved. Some of the tests were performed on an acid mine drainage (AMD). An analysis of the AMD is shown below in Table 1.

TABLE 1

Analysis of Acid Mine Drainage

| Component | Concentration (mg/L) | Component | Concentration (mg/L) |
|---|---|---|---|
| Mg | 401 | Cd | .35 |
| Ca | 329 | B | 0.23 |
| Mn | 170 | Ba | 0.14 |
|  |  | Pb | 0.14 |
| Mn | 130 | Li | 0.05 |
| Fe | 128 | Au | <0.05 |
|  |  | Se | <0.05 |
| Zn | 104 | As | 0.03 |
| Na | 91 |  |  |
| K | 14 | Co | 0.02 |
| Si | 6.8 | V | 0.02 |
| Al | 3.1 | Be | 0.008 |
| Cu | 2.1 | Ge | <0.008 |
| Ni | 1.4 | Cr | 0.004 |
| P | 1.1 | Mo | <0.003 |
|  |  | Hg | <0.002 |
| Sr | 0.38 |  |  |

In each experiment in Table 2, the AMD sample was spiked to 25 or 50 mg/L Cu with $CuSO_4$ and diluted (1 part AMD to 3 parts demineralized $H_2O$).

The paper fiber, as a 2 weight percent slurry, was prepared by shredding newspaper in water using a blender. The ash content of the sample was less than 2%.

The tests were conducted in baffled 600 to 1000 ml beakers using gentle mixing at room temperature (22° to 24° C.) for 7 to 10 minutes. A polyacrylamide flocculant was used in some of the experiments as noted in Table 2. The polyacrylamide flocculant employed is sold under the trademark "PERCOL 351". After flocculation, the precipitate and/or fibers were settled, decanted and the thickened slurry was filtered through 48 or 65 mesh screens, or paper towel filter.

The pH was maintained at 9.1 with 0.73 grams of $Na_2CO_3$. Hydrogen peroxide was added in the amount of 30 mg to oxidize manganese to $MnO_2$. The solution temperature was maintained at 23° C. for 10 minutes Other experimental conditions or procedures are described in Table 2.

As shown below in Table 2, with paper fiber added, the precipitate settled roughly three times faster and was filterable through a loose paper fiber filter. The supernatant solution and filtrate were crystal clear. In those tests where no paper fiber was employed, finer precipitates passed through the filter to produce a less pure solution than was obtained with paper fiber. Additionally, the volume of the pressed cake and paper fiber is about a tenth as much as the centrifuged precipitate when no paper fiber was employed (which is analogous to the thickened sludge in a settling pond of a conventional purification process).

TABLE 2

The Effect of Paper Fiber on the Separation of Heavy Metals Precipitate

| Test Objective | Test Conditions | Results |
| --- | --- | --- |
| Precipitating of Cu, Zn, Mn, Fe from diluted AMD with Na2CO3 plus paper fiber to determine effect on thickening and filtration. | Paper fiber = 0.2 g<br>Precipitate separated from solution by filtration through 7.5 cm paper fiber filter at 1" Hg vacuum. The moist cake was pressed, dried at 85 C., and ignited at 700 C. | Settling rate = 0.7 ft/min, thickened slurry = 50 ml in 10 min.<br>clear supernatent solution<br>Filtration = 65 ml/20 sec (1.1 gpm/sq. ft.)<br>clear filtrate<br>Precipitate and fiber (pressed):<br><br>thickness = 0.1 mm<br>vol ~0.7 cc<br>moist wt = 1.83 g<br>dry wt = 0.40 g, (21.9% solids)<br>ignited wt = 0.18 g |
| Precipitating of Cu, Zn, Mn, Fe from diluted AMD with Na2CO3 without paper fiber to determine precipitate filterability. | Paper fiber = none<br>Precipitate separated from solution by filtration through 7.5 cm paper fiber filter at 1" Hg vacuum. | Settling rate = 0.2 ft/min, thickened slurry = 55 ml in 10 min.<br>supernatent solution contained suspended fibers<br>Filtration = fines passed through filter |
| Precipitating of Cu, Zn, Mn, Fe from diluted AMD with Na2CO3 without paper fiber to determine how much sludge is formed. | Paper fiber = none<br>Precipitate separated from solution by centrifuge operating at 1000 rpm for 5 min. | Settling rate = 0.3 ft/min, thickened slurry = 40 ml in 10 min<br>supernatant solution contained suspended fines<br>Centrifuged sludge volume = 9 cc |

EXAMPLE 2

The tests in Table 3 below were done according to the same procedures as Example 1 with the exceptions enumerated in Table 3 and the preparation of the solutions. For the copper sulfide precipitation tests, solutions were made up using reagent grade $CuSO_4$ and $Na_2SO_4$ salts.

The data from the tests in Table 3 show the applicability of paper fiber as a settling and filtration aid for precipitating Cu as hydroxide, silicate, sulfide, and xanthate and Cu, Zn, Fe and Mn (which is oxidized to precipitate out $MnO_2$) as hydroxides or carbonates.

TABLE 3

Probing Tests with Paper Fiber

| Test Objective | Test Conditions | Results |
| --- | --- | --- |
| Heavy metal precipitation with Ca(OH)2 using paper fiber as settling and filter aid | Feed soln = 1.00 liter AMD<br>Mixture: Paper fiber = 0.23 g + Ca(OH)2 = 0.58 g mixed lime and paper fiber for ~15 min<br>pH = 8.9 adjusted with slight amount Ca(OH)2<br>H2O2 = added 30 mg after pH adjust to 8.9<br>Temp = 22 C., Time = 15 min<br>"PERCOL 351" = 0.5 mg<br>Solid/Liquid Separation = settled, and filtered through 65 mesh, 7.5 cm screen at 1" vacuum | Precipitate and fiber settled rapidly<br>Thickened slurry (200 cc) filtered in ~3 min giving a slimy cake |
| Cu precipitation as silicate with paper fiber settling and filter aid | Feed soln = 50 mg/L Cu + 1.3 g/L Na2SO4, pH 2.9, 1.00 liter<br>Mixture<br><br>Paper fiber = 0.2 g<br>Na2SiO3.Na2O soln = 0.3 ml 40–42 Be soln (~150 mg)<br>pH = 7.8 with Ca(OH)2 or H2SO4<br>Temp = 22 C., Time = 5 min<br>"PERCOL 351" = 0.5 mg<br>Solid/Liquid Separation = Settled and filtered through 7.5 cm, 65 mesh screen at 1" vacuum | Gelatinous type mixture<br>Poor separation through 65 mesh screen |
| Cu precipitation as sulfide with paper fiber as settling and filter aid | Feed soln = 50 mg/L Cu + 1.3 g/L Na2SO4, pH 2.9, 1.00 liter | Precipitate and fiber settled rapidly<br>Very slight H2S odor |

TABLE 3-continued

Probing Tests with Paper Fiber

| Test Objective | Test Conditions | Results |
|---|---|---|
| | Mixture | Screened OK |
| | Paper fiber = 0.2 g<br>CaS = 90 mg<br>Activated carbon = 110 mg powder F-400<br>pH = 8.0 with Ca(OH)2<br>Temp = 22 C., Time = 6 min<br>"PERCOL 351" = 0.5 mg<br>Solid/Liquid Separation = thickened and filtered through 7.5 cm, 65 mesh screen at 1" vacuum | |
| Cu precipitation as xanthate with paper fiber as settling and filter aid | Feed soln = 50 mg/L Cu + 1.3 g/L Na2SO4, pH 2.9, 1.00 liter<br>Mixture: | Precipitate and fiber settled rapidly<br>Very slight xanthate odor<br>Did not appear to "screen" as well as CaS/AC |
| | Paper fiber = 0.23 g<br>"KEX" = 280 mg<br>pH = 6.8 with Ca(OH)2<br>Temp = 22 C., Time = 8 min<br>"PERCOL 351" = 0.3 mg<br>Flocculant = 0.5 mg "PERCOL 351"<br>Solid/Liquid Separation = thickened and filtered through 7.5 cm, 65 mesh screen at 1" vacuum | |
| Cu sulfide precipitation from CuSO4 + Na2SO4 soln using NaHS and paper fiber | Feed soln = 50 mg/L Cu + 1.3 g/L Na2SO4, pH 2.9, 1.00 liter<br>Mixture: | Settled poorly, added another 0.5 mg "PERCOL 351" to flocculate, then solids settled rapidly |
| | NaHS added = 66 mg tech flake<br>Paper fiber = 0.2 g<br>"PERCOL 351" = 0.5 mg<br>pH = 7.2 with Na2CO3<br>Temp = 22 C., Time = 10 min<br>Flocculant = 0.5 mg "PERCOL 351"<br>Solid/Liquid Separation = thickened and filtered through 7.5 cm, 65 mesh screen at 1" vacuum | Screened rapidly<br>Comment: Flocculant best added after neutralization |
| Cu sulfide precipitation from CuSO4 + Na2SO4 soln using NaHS and paper fiber | Feed soln = 50 mg/L Cu + 1.3 g/L Na2SO4, pH 2.9, 1.00 liter<br>Mixture: | Settled poorly, supernate = brownish (colloidal CuS)<br>Comment: Best add NaHS first then adjust pH |
| | NaHS = 66 mg tech flake<br>Paper fiber = 0.2 g<br>Na2CO3 = 0.37 mg<br>pH = 7.2<br>Temp = 22 C., Time = 10 min<br>Flocculant = 0.5 mg "PERCOL 351"<br>Solid/Liquid Separation = thickened and filtered through 7.5 cm, 65 mesh screen at 1" vacuum | |
| Cu sulfide precipitation from CuSo4 + Na2SO4 soln using NaHS and paper fiber | Feed soln = 50 mg/L Cu + 1.3 g/L Na2SO4, pH 2.9, 1.00 liter<br>Mixture: | Settled rapidly<br>Filtered OK, clear filtrate |
| | NaHS = 66 mg tech flake<br>Paper fiber = 0.2 g<br>pH = 7.1 with Na2CO3<br>Temp = 22 C., Time = 5 min<br>Flocculant = 0.5 mg "PERCOL 351"<br>Solid/Liquid Separation = thickened and filtered through 7.5 cm, 48 mesh screen at 1" vacuum | |
| Cu sulfide precipitation from soln | STEP NO. 1 | Assays (mg/L)  Cu   Zn   Mn   Fe |
| using NaHS and paper fiber - Two stage precipitation first with NaHS at pH 5 to precipitate Cu, then with Na2CO3 to | Feed soln = Cu-spiked AMD, 1.00 liter<br>Mixture | Feed soln        23   25   32   14<br>Treated soln   0.6  24   31   11<br>% precipitated  97  <10  <10   21 |
| precipitate ZN, Fe, and Mn at pH 8.4 | NaHS added = 70 mg tech flake<br>Paper fiber = 0.2 g<br>pH = 5.4 with 140 mg Na2CO3<br>Temp = 22 C., Time = 5 min<br>Flocculant = 0.5 mg "PERCOL 351"<br>Solid/Liquid Separation = thickened and | Settled rapidly<br>Filtered OK, clear filtrate |

TABLE 3-continued

Probing Tests with Paper Fiber

| Test Objective | Test Conditions | Results |
|---|---|---|
| | filtered through 7.5 cm, 48 mesh screen at 1" vacuum<br>STEP NO. 2 | Assays (mg/L)     Cu   Zn   Mn   Fe |
| | Feed soln = NaHS filtrate from Step No. 1<br>Paper fiber = 0.2 g<br>pH = 8.4 with Na2CO3<br>Temp = 22 C., Time = 7 min<br>Flocculant = 0.5 mg "PERCOL 351"<br>Solid/Liquid Separation = thickened and filtered through 7.5 cm, 48 mesh screen at 1" vacuum | Feed soln (step 1)    23   25   32   11<br>NaHS filtrate (step 1)   0.6   24   31   11<br>Treated soln (step 2)   <0.1   0.9   22   <0.5<br>% precipitated     >99   96   31   95<br>(total for steps 1 and 2):<br>Settled rapidly<br>Filtered OK, clear filtrate |
| Cu sulfide precipitation without paper fiber | Feed soln = diluted, Cu spiked AMD<br>NaHS added = 70 mg/L<br>Paper fiber = none<br>pH = 5.5 with Na2CO3<br>Temp = 22 C., Time = 7 min<br>Flocculant = 0.5 mg "PERCOL 351" | Precipitate flocculated BUT settled slowly<br>Filtered OK through towel filter - sime fines in filtrate<br>Comment: appears paper fiber collects sulfide precipitate and makes settling and filtering better |
| Mn precipitation from spiked AMD using H2O2 to oxidize Mn to MnO2 at pH 8.5 | Feed soln = diluted, Cu spiked AMD<br>H2O2 added = 1.8 mg per mg Mn<br>Paper fiber = 0.2 g/L as slurry<br>Sand = 0.2 g/L, −48 mesh<br>pH = 8.6 with Na2CO3<br>Temp = 22 C., Time = 12 min<br>Flocculant = 0.5 mg "PERCOL 351"<br>Solid/Liquid Separation = thickened and filtered through 7.5 cm, 48 mesh screen at 1" vacuum | Assays (mg/L)    Cu    Zn   Mn   Fe<br>Feed soln     23    26   32   15<br>Treated soln   <0.5   0.6   5.0   <0.2<br>% precipitated   >97   98   84   >98<br>The fiber and precipitate settled rapidly and filtered OK, clear filtrate.<br>Reagent addition (lb per 1000 gal):<br>5.5 Na2CO3, 0.5 H2O2, 1.7 paper fiber;<br>1.7 sand, 0.004 flocculant |
| Mn precipitation from simulated AMD by contacting with precipitated MnO2 | Feed soln = diluted, Cu spiked AMD<br>Feed soln assay (mg/L) = 23 Cu, 26 Zn, 15 Fe, 31 Mn; pH 2.9<br>MnO2 added = ~200 mg/L MnO2 as slurry<br>Paper fiber = 0.2 g/L<br>Sand = 0.2 g/L −48 mesh<br>pH = 8.6 with Na2CO3<br>Temp = 22 C., Time = 8 min<br>Solid/Liquid Separation = thickened and filtered through 7.5 cm, 48 mesh screen at 1" vacuum | Assays     min    mg/L Mn   % Precipitated<br>Feed soln        31<br>Treated soln   10    23        26<br>                 30    21        32<br>Settled fast, but some fines suspended<br>Filtered well, clear filtrate |
| Reaction of xanthated paper fiber with diluted AMD | Xanthating - Paper fiber = 5.0 g, H2O = 175 ml,<br>CS2 = 10 g, Ethanol = 6.0 g<br>Contact: Temp = 23 C., Time = 18 hr<br>Diluted AMD = 250 ml AMD + 25 mg Cu to 1000 ml<br>Paper fiber (xanthated) = 8.2 g, pH rose from 2.8 to 7.1<br>Temp = 22 C., Time = 9 min<br>Flocculant = 0.5 mg "PERCOL 351"<br>Solid/Liquid Separation = settled, and filtered | Assays, mg/L    Mn   Zn   Cu   Fe<br>Feed soln         30    24   24   13<br>Treated soln    28   4.6   <0.1 2.8<br>Fiber and precipitate = 2.23 g moist<br>floc (e.g., the flocculated precipitate) settled OK, light floc tended to flow<br>Filtered OK |
| Treated diluted AMD with impregnated DEHP(Ca) - Peat.<br>Test 1 = beaker contact | Impregnated Peat Mixture: Peat = 7.73 g,<br>"DEHPA" =<br>5.08 g, 6.2 acetone, mixed and evaporated at 35 C.<br>Weight = 13.0 g<br>Diluted AMD = 25% AMD + 25 mg/L Cu;<br>1.00 L<br>DEPHA - peat mix = 1.33 g<br>pH = adjusted to 7.0 with 0.38 g Na2CO3<br>Temp = 22 C., Time = 10 & 24 min<br>Solid/Liquid Separation = added 0.22 g paper fiber, stirred + 0.5 mg "PERCOL 351" | Assays, mg/L    Mn   Zn   Cu   Fe<br>Feed soln            30   24   24   13<br>Treated soln, 10 min   27   16   3.5   <0.1<br>Treated soln, 24 min   26   13   2.6   <0.1<br>Floc (e.g., the flocculated precipitate) settled fast<br>Filtered OK |
| Treatment of AMD with paper fiber and lime | Feed soln = AMD + 50 mg/L Cu;<br>1000 ml<br>Paper fiber = 0.42 g paper as pulp + sand = 0.43 g −48 mesh<br>pH = maintained at 9.3 with 0.82 g Ca(OH)2<br>H2O2 = 129 mg<br>Temp = 22 C., Time = 10 min<br>Solid/Liquid Separation = +0.5 mg "PERCOL 351," settled and filtered through 7.5 cm towel filter at 2" Hg vacuum | Settling rate = 15 ft/hr<br>Thickened slurry (1 hr) = 1.6 wt % solids<br>Filter rate = 0.8 gpm/sq. ft.<br>Cake = 8.56 g moist, 1.62 g dry, 19% solids |

TABLE 3-continued

Probing Tests with Paper Fiber

| Test Objective | Test Conditions | Results |
| --- | --- | --- |
| Treatment of AMD with paper fiber and limestone and Na2CO3 | Feed soln = AMD + 50 mg/L Cu; 1000 ml<br>Paper fiber = 0.23 g paper as pulp + limestone = 0.43 g powder<br>pH = maintained at 9.0 with 2.25 g Na2CO3<br>H2O2 = 130 mg<br>Temp = 22 C., Time = 8 min<br>Solid/Liquid Separation = +0.5 mg "PERCOL 351," settled and filtered through 7.5 cm towel filter at 2" Hg vacuum | Settling rate = 7.5 ft/hr FINES SUSPENDED<br>Thickened slurry (1 hr) = 1.3 wt % solids<br>Filter rate = 0.1 gpm/sq. ft.<br>Cake = 6.28 g moist, 1.32 g dry, 21% solids |
| Treatment of diluted AMD with Portland cement without paper filter | Feed soln = 250 ml AMD + 50 mg Cu diluted to 1000 ml.<br>Paper fiber = none<br>Portland cement = 0.71 g to pH 8.9<br>H2O2 = 30 mg<br>pH = maintained at 9.1 with 0.8 mg Ca(OH)2<br>Temp = 23 C., Time = 10 min<br>Solid/Liquid Separation = added 0.5 mg "PERCOL 351" to flocculated solids, settled, decanted, and filtered through 7.5 cm paper fiber filter at 1" Hg vacuum | Settling rate = 0.17 ft/min<br>Thickened slurry = 50 ml in 10 min<br>some fines in suspension<br>Filtration = fines passed through filter |
| Treatment of diluted AMD with Portland cement plus paper fiber | Feed soln = 250 ml AMD + 50 mg Cu diluted to 1000 ml.<br>Paper fiber = 0.2 g<br>Portland cement = 0.55 g to pH 5.6<br>H2O2 = 30 mg<br><br>pH = maintained at 9.1 with 74 mg Ca(OH)2<br>Temp = 23 C., Time = 10 min<br>Solid/Liquid Separation = added 0.5 mg "PERCOL 351" to flocculated solids, settled, decanted, and filtered through 7.5 cm paper fiber filter at 1" Hg vacuum, pressed moist cake, dried at 85 C., and ignited at 700 C. | Settling rate = 2 ft/min<br>Thickened slurry = 50 ml in 10 min<br>clear supernatant solution<br>Filtering = 50 ml/8 sec (2.8 gpm/sq. ft.)<br>Precipitate and fiber (pressed):<br><br>thickness = 0.1 mm<br>moist wt = 2.58 g<br>dry wt = 0.77 g, (29.8% solids)<br>ignited wt = 0.53 g |
| Precipitating of Cu, Zn, Mn, Fe from diluted AMD with Na2CO3 plus paper fiber - effect on thickening and filtration | Feed soln = 250 ml AMD + 50 mg Cu diluted to 1000 ml.<br>Paper fiber = 0.2 g<br>H2O2 = 30 mg<br>pH = maintained to 9.1 with 0.73 g Na2CO3<br><br>Temp = 23 C., Time = 10 min<br>Solid/Liquid Separation = 0.5 mg "PERCOL 351" to flocculated solids, settled, decanted, and filtered through 7.5 cm paper fiber filter at 1" Hg vacuum, pressed moist cake, dried at 85 C., and ignited at 700 C. | Settling rate = 0.7 ft/min<br>Thickened slurry = 50 ml in 10 min<br>clear supernatant solution<br>Filtration = 65 ml/20 sec (1.1 gpm/sq. ft.)<br>Precipitate and fiber (pressed):<br><br>thickness = 0.1 mm<br>vol ~0.7 cc<br>moist wt = 1.83 g<br>dry wt = 0.40 g, (21.9% solids)<br>ignited wt = 0.18 g |
| Precipitating of Cu, Zn, Mn, Fe from diluted AMD with Na2CO3 without paper fiber - determine precipitate filterability | Feed soln = 250 ml AMD + 50 mg Cu diluted to 1000 ml.<br>Paper fiber = none<br>H2O2 = 30 mg<br>pH = maintained to 9.1 with 0.73 g Na2CO3<br>Temp = 23 C., Time = 10 min<br>Solid/Liquid Separation = added 0.5 mg "PERCOL 351" to flocculated solids, settled, decanted, and filtered through 7.5 cm paper fiber filter at 1" Hg vacuum | Settling rate = 0.2 ft/min<br>Thickened slurry = 55 ml in 10 min<br>supernatant solution contained suspended fibers<br>Filtration = fines passed through filter |
| Precipitating of Cu, Zn, Mn, Fe from diluted AMD with Na2CO3 without paper fiber to determine how much sludge is formed | Feed soln = 250 ml AMD + 50 mg Cu diluted to 1000 ml.<br>Paper fiber = none<br>H2O2 = 30 mg<br>pH = maintained to 9.1 with 0.73 g Na2CO3<br>Temp = 23 C., Time = 10 min<br>Solid/Liquid Separation = added 0.5 mg "PERCOL 351" to flocculated solids, settled, decanted, and centrifuged solids at 1000 rpm for 5 min | Settling rate = 0.3 ft/min<br>Thickened slurry = 40 ml in 10 min<br>supernatant solution contained suspended fibers<br>Centrifuged sludge volume = 9 cc |
| "Blank" Test with paper fiber and demineralized water | Feed soln = demineralized water only, 1000 ml.<br>Paper fiber = 0.3 g<br><br>H2O2 = 10 mg<br>pH = maintained to 9.1 with Na2CO3<br>Temp = 23 C., Time = 10 min<br>Solid/Liquid Separation = added 0.5 mg "PERCOL | Paper fiber did NOT flocculate<br>Pressed fiber,<br><br>moist wt = 0.90 g<br>dried wt = 0.25 g<br>ignited wt = <0.002 g |

TABLE 3-continued

Probing Tests with Paper Fiber

| Test Objective | Test Conditions | Results |
| --- | --- | --- |
| | 351" and filtered through paper fiber. Pressed fiber, dried at 85 C., and ignited at 600–700 C. | |
| Precipitate CN from cyanide solution as | Feed soln = 0.5 g/L NaCN | Assays (mg/L) CN, total |
| ferric ferrocyanide using paper fiber as a filter aid | To 1000 ml soln was added 0.1 g Na2S2O5, H2SO4 to pH 5, added 0.3 g FeSO4, and adjusted to pH 8 with NaOH | Feed soln ~260<br>Treated soln 36<br>Flocculated and settled rapidly<br>Filtered well<br>Comment: colorless (no blue) filtrate was obtained |

While various embodiments of the present invention have been described in detail, it is apparent that modifications and adaptations of those embodiments will occur to those skilled in the art. However, it is to be expressly understood that such modifications and adaptations are within the scope of the present invention, as set forth in the following claims.

What is claimed is:

1. A method for remediation of aqueous feed solutions containing a metal, comprising:
   (a) precipitating the metal from a feed solution to form a precipitate wherein said metal is selected from the group consisting of aluminum, arsenic, beryllium, boron, cadmium, chromium, fluorine, nickel, selenium, vanadium, lithium, molybdenum, barium, lead, mercury, silver, copper, zinc, compounds thereof and mixtures thereof;
   (b) dispersing discrete fibers in said feed solution to form a product comprising a fiber and said precipitate;
   (c) removing said product from said feed solution to form a treated solution and a recovered product containing the metal precipitate and discrete fibers; and
   (d) separating the metal precipitate from the discrete fibers in the product to recover the metal.

2. The method, as claimed in claim 1, wherein said feed solution comprises a stream that has a rate of flow greater than about 10 gallons/minute.

3. The method, as claimed in claim 1, wherein said metal has a concentration in said feed solution of less than about 50 mg/l.

4. The method, as claimed in claim 1, wherein said treated solution has a concentration of said metal that is less than about 1.0 mg/l.

5. The method, as claimed in claim 1, wherein said precipitate is selected from the group consisting of hydroxides, silicates, sulfides, xanthates, phosphates, carbonates, cellulose-derivatives and mixtures thereof.

6. The method, as claimed in claim 1 wherein a precipitant is attached to the discrete fibers to precipitate said metal.

7. The method, as claimed in claim 1 wherein said precipitant is selected from the group consisting of hydroxides, silicates, sulfides, xanthates, phosphates, carbonates, hydroxyethyl cellulose and mixtures thereof.

8. The method, as claimed in claim 1, wherein said removing step comprises filtering said feed solution to form said recovered product.

9. The method, as claimed in claim 8 wherein said removing step comprises thickening said feed solution before said filtering step.

10. The method, as claimed in claim 8 wherein the pore size of the filter in said filtering step is sufficient to retain substantially all of said discrete fibers.

11. The method, as claimed in claim 1, wherein said removing step comprises separating said product from said feed solution by a density separation method.

12. The method, as claimed in claim 1, wherein said feed solution comprises water and said recovered product has a water content less than about 90% by weight.

13. The method, as claimed in claim 1 wherein said dewatered recovered product has a water content less than about 30% by weight.

14. The method, as claimed in claim 1, wherein said discrete fibers comprise a component selected from the group consisting of cellulose, glass, plastic, cotton or wool.

15. The method, as claimed in claim 1, wherein said discrete fibers are substantially composed of cellulose.

16. The method, as claimed in claim 15 further comprising:
   contacting said feed solution with a flocculant after said dispersing step.

17. The method, as claimed in claim 16 wherein said flocculant is a polyacrylamide.

18. A method to remove a metal from an aqueous feed solution, comprising:
   continuously precipitating said metal from said feed solution to form a precipitate selected from the group consisting of hydroxides, peroxides, silicates, sulfides, xanthates, phosphates, carbonates, cellulose-derivatives and mixtures thereof wherein said metal is selected tom the group consisting of aluminum, arsenic, beryllium, boron, cadmium, chromium, fluorine, nickel, selenium, vanadium, lithium, molybdenum, barium, lead, mercury, silver, copper, zinc, and compounds thereof and mixtures thereof wherein the feed solution has a rate of flow of more than about 100 gallons/minute;
   (b) coutinuously mixing discrete cellulosic fibers in said feed solution to form a product comprising a cellulosic fiber and said precipitate; and
   (c) continuously filtering said product from said feed solution to form a recovered product and a treated solution.

19. The method as claimed in claim 18 wherein said feed solution is substantially free of solids before the precipitating step.

20. The method, as claimed in claim 18 wherein the concentration of said discrete cellulosic fibers in said feed solution is from about 10 to about 1,000 mg/l.

21. The method, as claimed in claim 18 further comprising compacting said recovered product.

22. A method for concentrating metals in a feed solution comprising:

(a) continuously precipitating said metals from said feed solution to form a precipitate, the feed solution having a rate of flow greater than about 100 gallons/minute;

(b) continuously dispersing discrete fibers in said feed solution to form a product comprising a fiber and said precipitate;

(c) contacting a flocculent with the feed solution;

(d) thickening the feed solution to form a thickened feed solution;

(e) continuously filtering the thickened feed solution to form a recovered product and a treated solution;

(f) dewatering the recovered product to form a dewatered product;

(g) combusting the dewatered product to form a waste gas containing the metal;

(h) scrubbing the waste gas with a scrubbing solution to solubilize the metal therein; and (i) removing the metal from the scrubbing solution.

23. The method, as claimed in claim 2, wherein the feed solution is substantially free of solids before the precipitating step.

24. The method, as claimed in claim 2, wherein said rate of flow is greater than about 500 gallons/minute.

25. The method, as claimed in claim 1, wherein at lest about 95% of the precipitate forms a product with the discrete fibers.

26. The method, as claimed in claim 1, wherein the concentration of the discrete fibers in the feed solution is from about 100 to about 500 mg/L.

27. The method, as claimed in claim 2, wherein the rate of flow is greater than about 100 gallons/minute.

28. The method, as claimed in claim 1, wherein the recovered product comprises at least about 75% of the precipitate in the feed solution.

29. The method, as claimed in claim 1, wherein the recovered product comprises at least about 85% of the precipitate in the feed solution.

30. The method, as claimed in claim 1, wherein the recovered product comprises at least about 90% of the metal precipitate in the feed solution.

31. The method, as claimed in claim 1, wherein at least about 75% of the precipitate forms a product with the fibers.

32. The method, as claimed in claim 1, wherein the precipitating step comprises:

contacting the feed solution with a precipitant, wherein the amount of the precipitant contacted with the feed solution is at least about 200% of the stoichiometric amount relative to the amount of the metal to be removed from the feed solution.

33. The method, as claimed in claim 18, wherein the mixing step is done in the substantial absence of a flocculent.

34. The method, as claimed in claim 1, wherein the separating step comprises:

(e) dewatering the product mass to form a dewatered product having a water content less than about 30% by weight.

35. The method, as claimed in claim 34, wherein the separating step comprises:

(f) combusting the dewatered product to form a waste gas.

36. The method, as claimed in claim 35, wherein the separating step comprises:

(g) scrubbing the waste gas with a scrubbing solution to form a scrubbing solution comprising the metal; and (h) recovering the metal from the scrubbing solution.

37. The method, as claimed in claim 18, further comprising before the continuously filtering step:

(d) thickening the feed solution to form a thickened feed solution;

(e) dewatering the recovered product to from a dewatered product;

(f) combusting the dewatered product to form a waste gas containing the metal; and (g) recovering the metal from the waste gas.

* * * * *